United States Patent
Kim et al.

(10) Patent No.: US 9,998,808 B2
(45) Date of Patent: Jun. 12, 2018

(54) PASSIVE OPTICAL NETWORK (PON) SUPPORTING FRAGMENTATION FUNCTION OF MEDIA ACCESS CONTROL (MAC) FRAME

(71) Applicant: ELECTRONICS AND TELECOMMUNICATIONS RESEARCH INSTITUTE, Daejeon (KR)

(72) Inventors: Kwang Ok Kim, Jeonju-si (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/288,106

(22) Filed: Oct. 7, 2016

(65) Prior Publication Data
US 2017/0105061 A1    Apr. 13, 2017

(30) Foreign Application Priority Data

Oct. 8, 2015 (KR) .................. 10-2015-0141735
Oct. 4, 2016 (KR) .................. 10-2016-0127762

(51) Int. Cl.
*H04Q 11/00* (2006.01)
*H04L 12/721* (2013.01)

(52) U.S. Cl.
CPC ......... *H04Q 11/0067* (2013.01); *H04L 45/26* (2013.01); *H04Q 11/0003* (2013.01); *H04Q 2011/0047* (2013.01); *H04Q 2011/0081* (2013.01)

(58) Field of Classification Search
None
See application file for complete search history.

(56) References Cited

U.S. PATENT DOCUMENTS

| | | | |
|---|---|---|---|
| 5,978,118 A * | 11/1999 | Flaherty | ........... H04L 12/66 398/1 |
| 7,031,343 B1 | 4/2006 | Kuo et al. | |
| 7,818,389 B1 * | 10/2010 | Chiang | ........... H01M 4/92 709/212 |
| 7,924,882 B2 | 4/2011 | Nagai et al. | |
| 2002/0080444 A1 * | 6/2002 | Phillips | ........... H04B 10/272 398/79 |
| 2007/0133557 A1 | 6/2007 | Lee et al. | |
| 2007/0133800 A1 * | 6/2007 | Kim | ........... H04L 63/0428 380/256 |
| 2011/0194854 A1 | 8/2011 | Freire et al. | |
| 2013/0259036 A1 | 10/2013 | Tamir et al. | |
| 2014/0245114 A1 | 8/2014 | Thaler et al. | |

* cited by examiner

Primary Examiner — Darren E Wolf
(74) Attorney, Agent, or Firm — LRK Patent Law Firm

(57) ABSTRACT

An optical line terminal (OLT) and an optical network unit (ONU) configured to generate a plurality of fragments by fragmenting a media access control (MAC) frame and to transmit the plurality of generated fragments, when a length of the MAC frame is greater than or equal to a maximum transmission unit (MTU).

13 Claims, 12 Drawing Sheets

PASSIVE OPTICAL NETWORK (PON) SUPPORTING FRAGMENTATION FUNCTION OF MEDIA ACCESS CONTROL (MAC) FRAME

CROSS-REFERENCE TO RELATED APPLICATIONS

This application claims the benefit of Korean Patent Application No. 10-2015-0141735 and of Korean Patent Application No. 10-2016-0127762, respectively filed on Oct. 8, 2015 and Oct. 4, 2016, in the Korean Intellectual Property Office, the disclosures of which are incorporated herein by reference.

BACKGROUND

1. Field of the Invention

Embodiments relate to a passive optical network (PON), and more particularly, to an optical line terminal (OLT) and an optical network unit (ONU) included in a PON.

2. Description of the Related Art

A passive optical network (PON) may employ a time division multiple access (TDMA) scheme of providing a service by dividing time, and a wavelength division multiplexing (WDM) scheme of providing a service by dividing a wavelength, based on a transmission scheme.

TDMA-PONs employing the TDMA scheme may be classified into an Ethernet PON (EPON) and a gigabit-capable PON (GPON) based on a used transmission protocol. The EPON and the GPON may transfer signals in a downstream direction based on a broadcast scheme and may transfer signals in an upstream direction based on the TDMA scheme, using a point-to-multipoint link architecture. To allow optical network units (ONUs) to transmit signals in the upstream direction based on the TDMA scheme without a collision, an optical line terminal (OLT) may determine a transmission time of the ONUS based on a band allocation algorithm.

The EPON may include, for example, a 1G-EPON that supports a transmission rate of 1.25 gigabits per second (Gbps) in the downstream direction and the upstream direction, an asymmetric 10G/1G-EPON that supports a transmission rate of 10.3125 Gbps in the downstream direction and that supports a transmission rate of 1.25 Gbps in the upstream direction, and a symmetric 10G/10G-EPON that supports a transmission rate of 10.3125 Gbps in the downstream direction and the upstream direction. The EPON may support a transmission of an Ethernet frame with a length of 64 bytes to 1,518 bytes.

To allocate a transmission band to at least one ONU connected to an OLT in the EPON, the OLT may use a GATE multi-point control protocol data unit (MPCPDU) message with a length of 64 bytes. The OLT may allocate a transmission time to an ONU based on a grant start time field of 4 bytes and a grant length field of 2 bytes included in the GATE MPCPDU message. When a local clock value of an ONU that receives the GATE MPCPDU message is identical to a time of the grant start time field, the ONU may turn on a laser of an optical transceiver and may transmit an Ethernet media access control (MAC) frame to the OLT during a time designated in the grant length field.

The ONU may subtract a time required to transmit the Ethernet MAC frame from a time allocated based on the grant length field. When a length of the time required to transmit the Ethernet MAC frame is less than a length of a time obtained by the subtracting, the ONU may transmit the Ethernet MAC frame. When the length of the time required to transmit the Ethernet MAC frame is greater than the length of the time obtained by the subtracting, the ONU may transmit idle data instead of the Ethernet MAC frame. When the time allocated based on the grant length field elapses, the ONU may turn off the laser and stop transmission.

Currently, the EPON does not provide a fragmentation function of the Ethernet MAC frame. When a length of the time allocated based on the grant length field or the length of the time obtained by the subtracting is less than the length of the time required to transmit the Ethernet MAC frame, the ONU may waste a band by transmitting idle data. A phenomenon in which the ONU wastes a band may become serious as a cycle time of transferring a GATE MPCPDU control message decreases or as a number of ONUs connected to an OLT increases.

SUMMARY

Embodiments provide a passive optical network (PON) including an optical line terminal (OLT) and an optical network unit (ONU) configured to fragment and transmit a media access control (MAC) frame.

According to an aspect, there is provided a MAC frame transmission method for downstream transmission, the MAC frame transmission method being performed by an OLT, and including registering an ONU configured to fragment a MAC frame, generating a plurality of fragments by dividing the MAC frame based on a maximum transmission unit (MTU) when a length of a MAC frame that is to be transmitted to the ONU is greater than or equal to the MTU, the MTU being a maximum length of a MAC frame to be transmitted at a time, and transmitting the plurality of fragments to the ONU.

The registering may include transmitting, to the ONU, discovery information indicating whether the OLT supports a fragmentation function of the MAC frame, determining whether the ONU supports the fragmentation function based on a registration request message that is transmitted by the ONU in response to the discovery information, determining whether the ONU is to activate the fragmentation function based on the registration request message, and transmitting, to the ONU, a registration message to request the ONU to activate the fragmentation function.

The generating may include, when the MAC frame is set to be divided and transmitted to the ONU, generating the plurality of fragments by dividing the MAC frame based on the MTU.

The transmitting may include recording which one of a start portion, a middle portion and an end portion of the MAC frame corresponds to each of the plurality of fragments in a start of logical link identifier (LLID) delimiter (SLD) field of a header of each of the plurality of fragments, and transmitting the plurality of fragments.

The transmitting may include recording whether each of the plurality of fragments corresponds to an end portion of the MAC frame in an LLID field of a header of each of the plurality of fragments, and transmitting the plurality of fragments.

The generating may include storing the plurality of fragments in a fragment queue of the OLT.

According to another aspect, there is provided a MAC frame reception method for upstream transmission, the MAC frame reception method being performed by an OLT, and including determining whether a fragment generated by dividing a MAC frame is received from an ONU, storing the fragment in a reassembly queue when the fragment is determined to be received, and restoring the MAC frame from fragments stored in the reassembly queue when all fragments generated from the MAC frame are received.

The determining may include determining, based on an LLID field or an SLD field of a header of the received fragment, whether the fragment generated by dividing the MAC frame is received from the ONU.

The storing may include storing the fragment in a reassembly queue corresponding to an LLID of the ONU.

According to another aspect, there is provided a MAC frame transmission method for upstream transmission, the MAC frame transmission method being performed by an ONU, and including joining an OLT configured to fragment a MAC frame, generating a plurality of fragments by dividing the MAC frame based on a MTU when a length of a MAC frame that is to be transmitted to the OLT is greater than or equal to the MTU, the MTU being a maximum length of a MAC frame to be transmitted at a time, and transmitting the plurality of fragments to the OLT.

The joining may include determining whether the OLT supports a fragmentation function of the MAC frame based on discovery information received from the OLT, transmitting a registration request message to the OLT to inform the OLT that the ONU supports the fragmentation function, when the OLT is determined to support the fragmentation function, and activating the fragmentation function based on a registration message transmitted by the OLT in response to the registration request message.

The generating may include, when the MAC frame is set to be divided and transmitted to the OLT, generating the plurality of fragments by dividing the MAC frame based on the MTU.

The transmitting may include recording that the ONU generates the plurality of fragments from the MAC frame in a single copy broadcast (SCB) field of a header of each of the plurality of fragments, and transmitting the plurality of fragments.

The generating may include storing the plurality of fragments in a fragment queue of the ONU.

According to another aspect, there is provided a MAC frame reception method for downstream transmission, the MAC frame reception method being performed by an ONU, and including determining whether a fragment generated by dividing a MAC frame is received from an optical line terminal (OLT), storing the fragment in a reassembly queue when the fragment is determined to be received, and restoring the MAC frame from fragments stored in the reassembly queue when all fragments generated from the MAC frame are received.

The determining may include determining, based on an LLID field of a header of the received fragment, whether the MAC frame is fragmented.

According to another aspect, there is provided a non-transitory computer readable recording medium storing a program to cause a computer to implement the methods described above.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
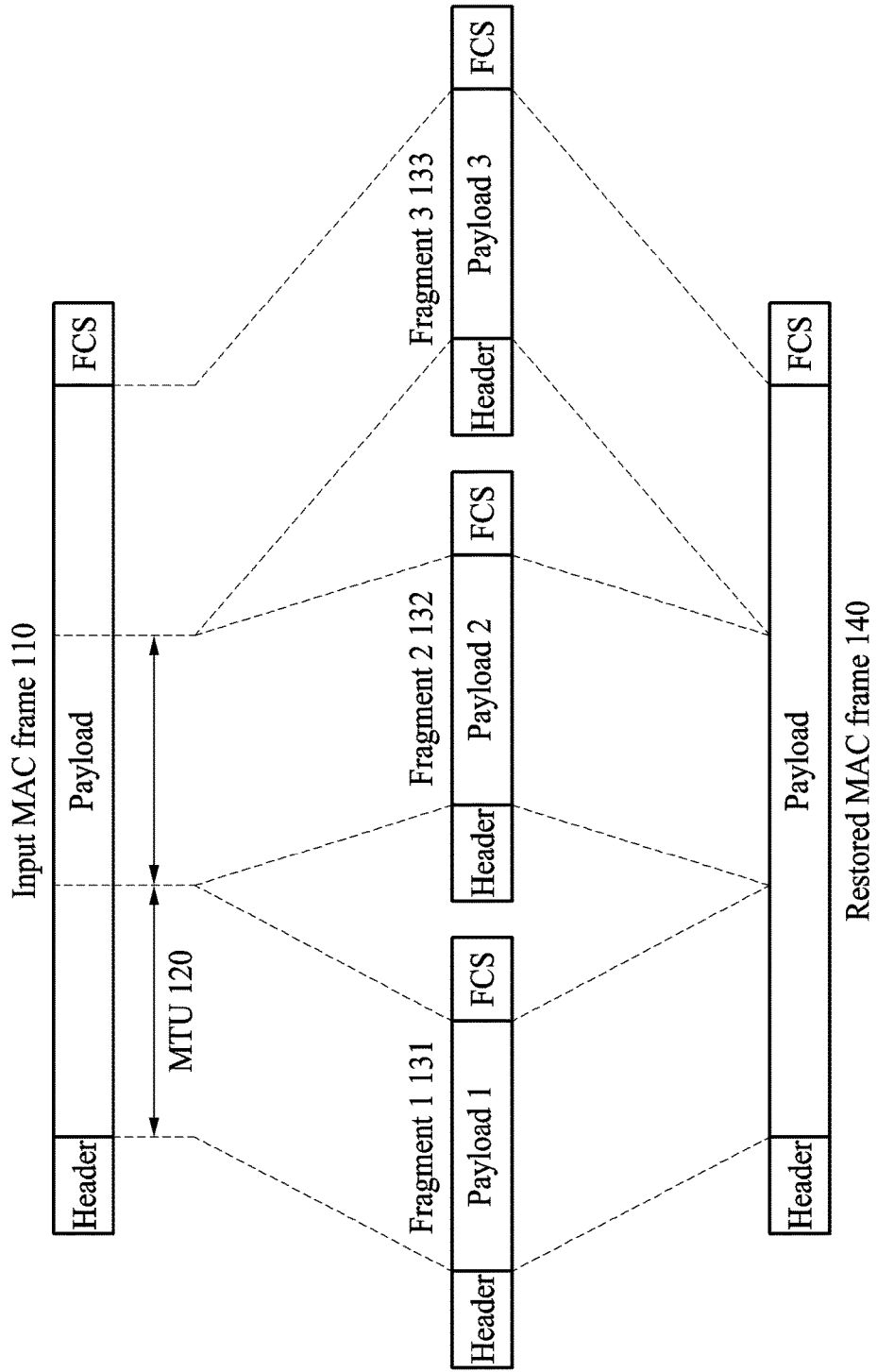
FIG. 1 is a diagram illustrating an operation of fragmenting a media access control (MAC) frame and reassembling the MAC frame in a passive optical network (PON) according to an embodiment.

Particular structural or functional descriptions of embodiments according to the concept of the present disclosure disclosed in the present disclosure are merely intended for the purpose of describing the embodiments and the embodiments may be implemented in various forms and should not be construed as being limited to those described in the present disclosure.

Though embodiments according to the concept of the present disclosure may be variously modified and be several embodiments, specific embodiments will be shown in drawings and be explained in detail. However, the embodiments are not meant to be limited, but it is intended that various modifications, equivalents, and alternatives are also covered within the scope of the claims.

Although terms of "first," "second," etc. are used to explain various components, the components are not limited to such terms. These terms are used only to distinguish one component from another component. For example, a first component may be referred to as a second component, or similarly, the second component may be referred to as the first component within the scope of the right according to the concept of the present disclosure.

When it is mentioned that one component is "connected" or "coupled" to another component, it may be understood that the one component is directly connected or coupled to another component or that still other component is interposed between the two components. Also, when it is mentioned that one component is "directly connected" or "directly coupled" to another component, it may be understood that no component is interposed therebetween. Expressions used to describe the relationship between components should be interpreted in a like fashion, for example, "between" versus "directly between," or "adjacent to" versus "directly adjacent to."

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings. The scope of the right, however, should not be construed as limited to the embodiments set forth herein. Regarding the reference numerals assigned to the elements in the drawings, it should be noted that the same elements will be designated by the same reference numerals.

Recently, a next-generation Ethernet passive optical network (NG-EPON) is being standardized. Standardization of the NG-EPON requires subscribers to provide a transmission band of 10 gigabits per second (Gbps) or higher. The NG-EPON requires a transmission of a media access control (MAC) frame with a length exceeding 2 kilobytes (KB), and a transmission of a jumbo frame with a length exceeding 9 KB. When a maximum transmission unit (MTU) increases to satisfy the above-described requirements, a latency may increase as a length of a frame to be transmitted increases. In addition, a transmission efficiency may further decrease based on a grant length. The NG-EPON may support a $5^{th}$ generation (5G) mobile backhaul service as an application service. The 5G mobile backhaul service may require supporting of a jumbo frame with a length greater than or equal to 9 KB. Thus, to transmit a MAC frame with a length greater than or equal to 2 KB, the NG-EPON may need to support a fragmentation function and a reassembly function of the MAC frame.

FIG. 1 is a diagram illustrating an operation of fragmenting a MAC frame and reassembling the MAC frame in a PON according to an embodiment. The MAC frame may include data (or a payload), a header (or a preamble) including information associated with a transmission of the MAC frame, and a frame check sequence (FCS) for checking data. A fragment may be a portion of a MAC frame generated by dividing the MAC frame, and may include a portion of data included in the MAC frame that is not divided. The PON may include an optical network unit (ONU) or an optical line terminal (OLT) configured to generate fragments from the MAC frame or restore a MAC frame from received fragments.

Referring to FIG. 1, an OLT or an ONU may generate a fragment 1 131, a fragment 2 132 and a fragment 3 133 by fragmenting an input MAC frame 110. The fragmenting of the input MAC frame 110 may refer to dividing a payload of the input MAC frame 110 into a plurality of fragments. The OLT or the ONU may fragment the input MAC frame 110 so that a length of each of a payload 1 included in the fragment 1 131, a payload 2 included in the fragment 2 132 and a payload 3 included in the fragment 3 133 may be less than or equal to a preset length. In FIG. 1, the OLT or the ONU may fragment the input MAC frame 110 so that a length of each of the payload 1 through the payload 3 may be less than or equal to an MTU 120. The MTU 120 may be a maximum length of a MAC frame that may be transmitted at a time.

Headers of the fragment 1 131 through the fragment 3 133 may indicate that the fragment 1 131 through the fragment 3 133 are generated by fragmenting the input MAC frame 110. The headers may not have an influence on an existing OLT or an existing ONU that may not fragment a MAC frame or assemble fragments. Since the payload 1 through the payload 3 merely correspond to a portion of the payload of the input MAC frame 110, the OLT or the ONU may set an FCS of each of the fragment 1 131 through the fragment 3 133 to be different from an FCS of the input MAC frame 110.

In an example, when an OLT generates the fragment 1 131 through the fragment 3 133 from the input MAC frame 110, the fragment 1 131 through the fragment 3 133 may be transmitted to at least one ONU connected to the OLT in a downstream direction. The at least one ONU may detect which one of the fragment 1 131 through the fragment 3 133 is received based on a header of each of the fragment 1 131 through the fragment 3 133. Also, the at least one ONU may verify that the fragment 1 131 through the fragment 3 133 are generated by fragmenting the input MAC frame 110.

In another example, when an ONU generates the fragment 1 131 through the fragment 3 133 from the input MAC frame 110, the fragment 1 131 through the fragment 3 133 may be transmitted to an OLT in an upstream direction. The OLT may detect an ONU that transmits each of the fragment 1 131 through the fragment 3 133 based on a header of each of the fragment 1 131 through the fragment 3 133. Also, the ONU may verify that the fragment 1 131 through the fragment 3 133 are generated by fragmenting the input MAC frame 110.

When the fragment 1 131 through the fragment 3 133 are received, the OLT or the ONU may restore the input MAC frame 110 from the fragment 1 131 through the fragment 3 133. Referring to FIG. 1, the OLT or the ONU may connect the payload 1 through the payload 3 included in the fragment 1 131 through the fragment 3 133, to generate a restored MAC frame 140.

As described above, the OLT or the ONU may transmit the fragment 1 131 through the fragment 3 133 generated by dividing the input MAC frame 110, and may assemble the fragment 1 131 through the fragment 3 133, to generate the restored MAC frame 140. Thus, the OLT or the ONU may support a fragmentation function or a restoration function of a MAC frame. Also, the OLT or the ONU may transfer information about fragmentation of a MAC frame without affecting an existing OLT or an existing ONU located in a PON or an optical distribution network according to a related art. Hereinafter, an operation of the OLT or the ONU to transfer the information about the fragmentation of the MAC frame without affecting the existing OLT or the existing ONU will be further described.

Figure 2:
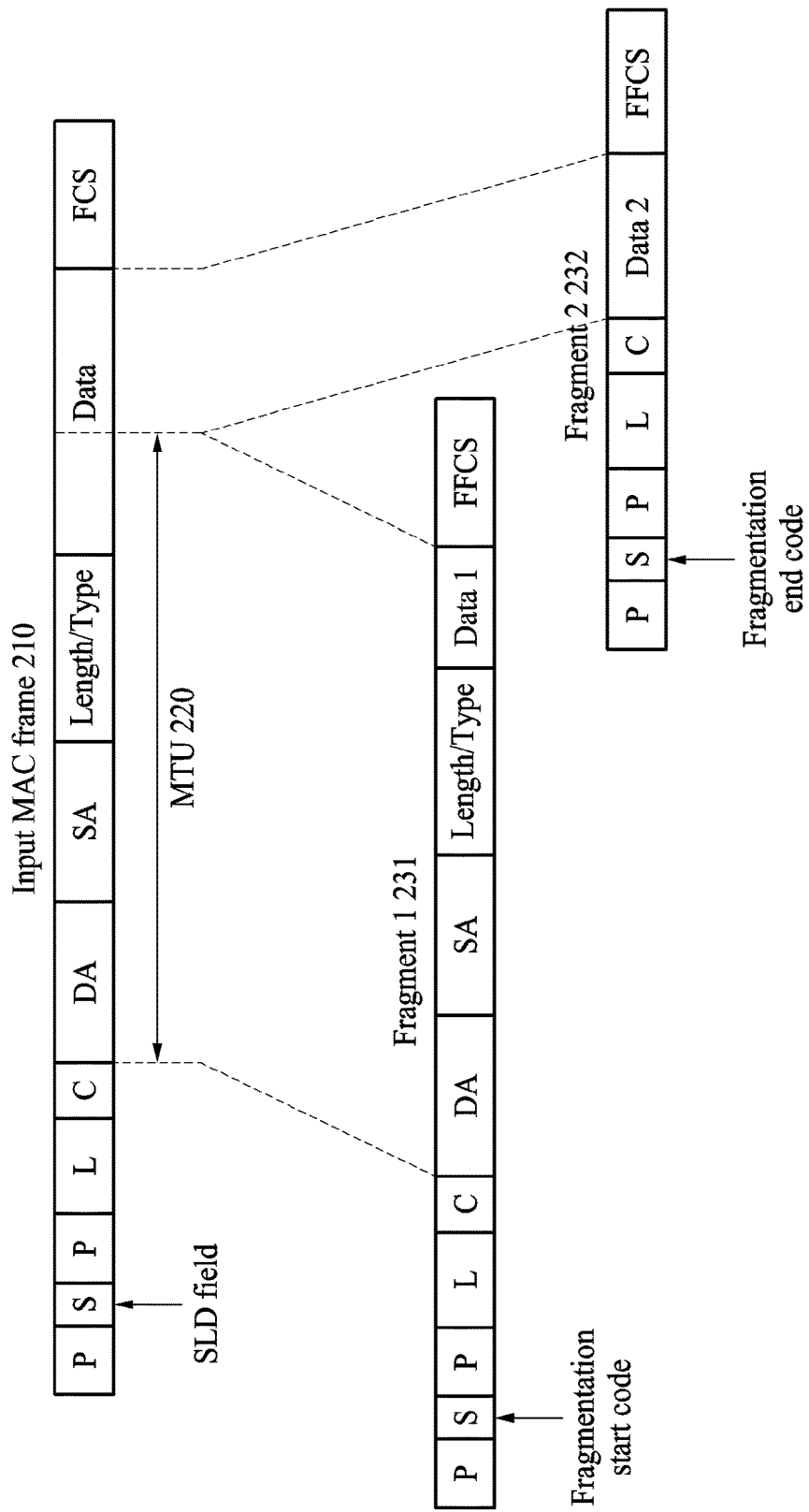
FIG. 2 is a diagram illustrating an operation of transferring information about fragmentation based on a start of logical link identifier (LLID) delimiter (SLD) field of a header in a PON according to an embodiment.

FIG. 2 is a diagram illustrating an operation of transferring information about fragmentation based on a start of logical link identifier (LLID) delimiter (SLD) field of a header in a PON according to an embodiment. Referring to FIG. 2, an OLT or an ONU according to an embodiment may generate a fragment 1 231 and a fragment 2 232 by fragmenting an input MAC frame 210 based on an MTU 220.

In FIG. 2, a header of the input MAC frame 210 may include an SLD field. The SLD field may indicate a start of an EPON MAC frame and may have a value of "D5" with 8 bits. The OLT or the ONU may record, in the SLD field, whether a MAC frame that is to be transmitted is a fragment and may transmit the MAC frame. Also, the OLT or the ONU may record, in the SLD field, which portion of a MAC frame is fragmented to generate a fragment to be transmitted, and may transmit the MAC frame. For example, the OLT or the ONU may provide information about fragmentation of a MAC frame based on an encoding value that indicates a start, a middle and an end of the fragmentation based on the SLD field.

In FIG. 2, an SLD field of a header of the fragment 1 231 may include a fragmentation start code. Also, an SLD field of a header of the fragment 2 232 may include a fragmentation end code. The OLT or the ONU may add a new FCS to each of the fragment 1 231 and the fragment 2 232 and may transmit the fragment 1 231 and the fragment 2 232. In FIG. 2, the new FCS may be represented as "FFCS."

When the fragment 1 231 and the fragment 2 232 are received, the ONU or the OLT may assemble the fragment 1 231 and the fragment 2 232 based on a value of the SLD field. Since the fragmentation start code is included in the SLD field of the fragment 1 231, the ONU or the OLT may verify that the input MAC frame 210 is fragmented and transmitted in response to reception of the fragment 1 231 being received. Also, in response to reception of the fragment 2 232 including the fragmentation end code, the ONU or the OLT may verify that all fragments generated from the input MAC frame 210 are received. For example, when a fragment including a fragmentation end code is received, the ONU or the OLT may restore the input MAC frame 210 by assembling previously received fragments. The ONU or the OLT may receive the fragment 2 232, may assemble the fragment 1 231 and the fragment 2 232, and may restore the input MAC frame 210.

When the ONU or the OLT does not support fragmentation of a MAC frame, the value of "D5" may be used as a value of the SLD field. When the ONU or the OLT transmits the input MAC frame 210 that is not fragmented without a change, the value of "D5" may be used as a value of the SLD field. Thus, the input MAC frame 210 may be received while preventing an existing OLT or an existing ONU from malfunctioning.

Figure 3:
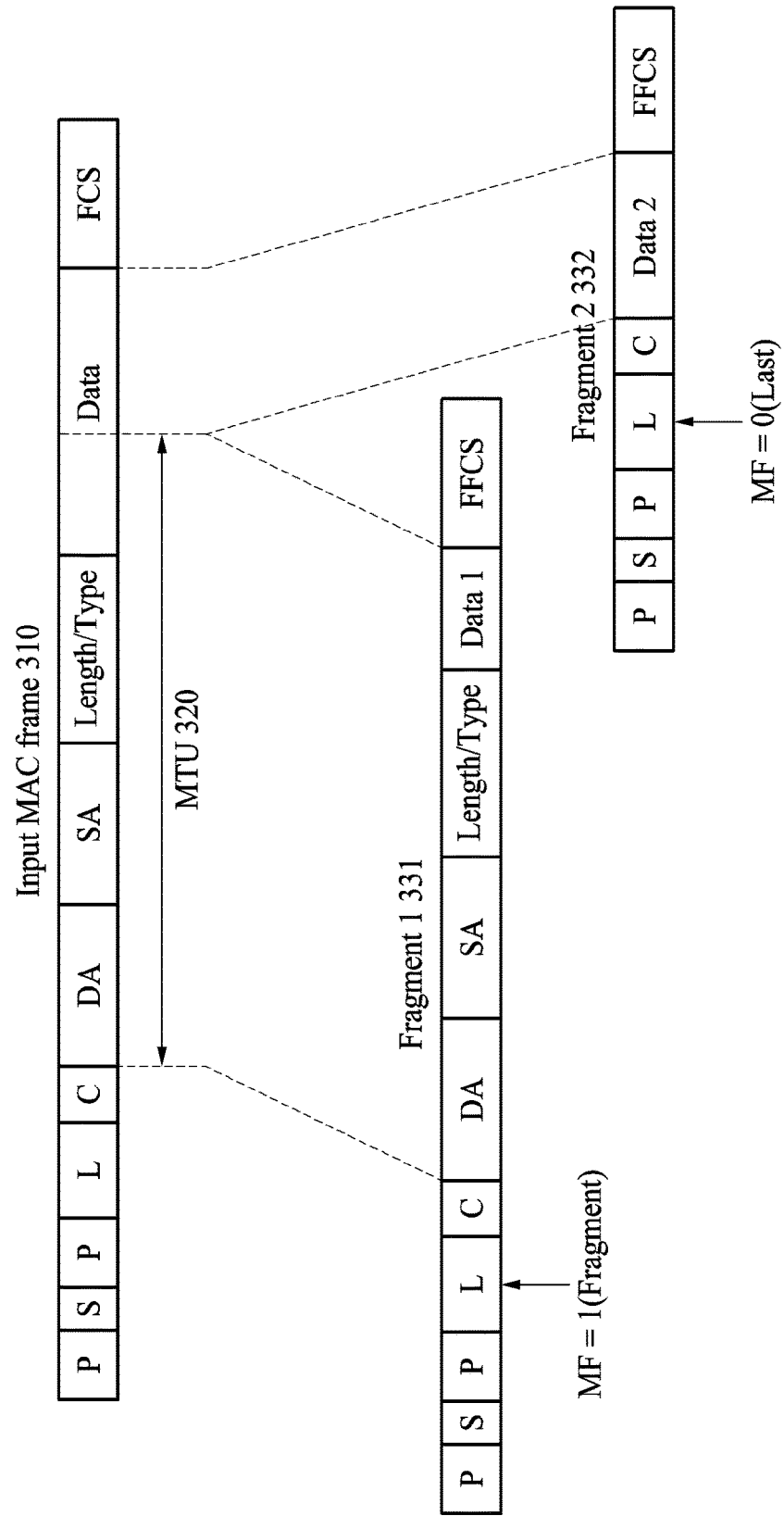
FIG. 3 is a diagram illustrating an operation of transferring information about fragmentation based on an LLID field of a header in a PON according to an embodiment.

FIG. 3 is a diagram illustrating an operation of transferring information about fragmentation based on an LLID field of a header in a PON according to an embodiment. Referring to FIG. 3, an OLT or an ONU according to an embodiment may generate a fragment 1 331 and a fragment 2 332 by fragmenting an input MAC frame 310 based on an MTU 320. A 2-byte LLID field of each of the fragment 1 331 and the fragment 2 332 may include a more fragment (MF) value that is downstream fragmentation information or upstream fragmentation information.

An LLID field may indicate an LLID that is a single identifier assigned to a single ONU to identify ONUS. In a 16-bit LLID field, mode bit may be recorded in a most significant bit (MSB) and an LLID may be recorded in lower 15 bits. The MSB may indicate single copy broadcast (SCB) information and may be used in the downstream direction. When an SCB value of a MAC frame is "1," ONUs may receive the MAC frame regardless of lower 15 bits of an LLID field. In addition, broadcasting of the MAC frame may be supported by the lower 15 bits of the LLID field. For example, all 1G-EPON ONUS may receive a MAC frame in which lower 15 bits of an LLID field correspond to a value of "0x7FFF," and all 10G-EPON ONUS may receive a MAC frame in which lower 15 bits of an LLID field correspond to a value of "0x7FFE."

In an example, in the downstream direction, a $15^{th}$ bit (that is, a bit 14) of an LLID field may be used as an MF value. In this example, an ONU may use lower 14 bits, numbered 13 through 0, as a unicast LLID value. Since the 14 bits are used, a maximum of 16,384 ONUs may be identified. For an ONU that does not support fragmentation, a $15^{th}$ bit of an LLID field may be set to "0." For an ONU that supports fragmentation, a $15^{th}$ bit of an LLID field may be used to indicate whether a MAC frame is fragmented. For example, an ONU may set a $15^{th}$ bit of an LLID field in a MAC frame to "0" and may transmit the MAC frame to an ONU that does not support fragmentation. Thus, in a single PON, an ONU that does not support fragmentation and an ONU that supports fragmentation may coexist.

In an example, in the upstream direction, an MSB (that is, a bit 15) of an LLID field may be used as an MF value. An ONU that does not support fragmentation may not use the MSB, and accordingly an OLT may set an MSB of an LLID field in a MAC frame that is to be transmitted to the ONU that does not support fragmentation to "0" at all times. The OLT may record "1" as the MSB of the LLID field, to indicate that the MAC frame is a fragment. Based on the MSB of the LLID field, the OLT may provide services to both an ONU that supports fragmentation and an ONU that do not supports fragmentation in the upstream direction.

The OLT or the ONU may indicate, based on an MF value, whether a fragment corresponds to an end portion of the input MAC frame 310. Referring to FIG. 3, the input MAC frame 310 may be divided into two fragments, for example, the fragment 1 331 and the fragment 2 332. The fragment 1 331 and the fragment 2 332 may have the same LLID value. The fragment 2 332 that is a last fragment may have a value of "0" as an MF value, and the fragment 1 331 that is the other fragment may have a value of "1" as an MF value.

When the fragment 1 331 and the fragment 2 332 are received, the OLT or the ONU may determine, based on the MF value, whether the fragment 1 331 and the fragment 2 332 correspond to the end portion of the input MAC frame 310. Since the MF value of the fragment 1 331 is "1" as shown in FIG. 3, the OLT or the ONU may determine that the fragment 1 331 does not correspond to the end portion of the input MAC frame 310. Also, the OLT or the ONU may determine that all fragments of the input MAC frame 310 are received in response to reception of the fragment 2 332 with the MF value of "0." For example, when a fragment with an MF value of "0" is received, the OLT or the ONU may delete a preamble that is added, may connect payloads of all fragments, and may restore the input MAC frame 310.

As described above with reference to FIGS. 2 and 3, the OLT or the ONU according to the embodiment may record information about fragmentation in headers of fragments, to prevent an existing OLT or an existing ONU from malfunctioning even though fragments are received. Hereinafter, an operation of an OLT or an ONU according to the embodiment to transmit or receive fragments will be further described with reference to a structure of the OLT or the ONU.

Figure 4:
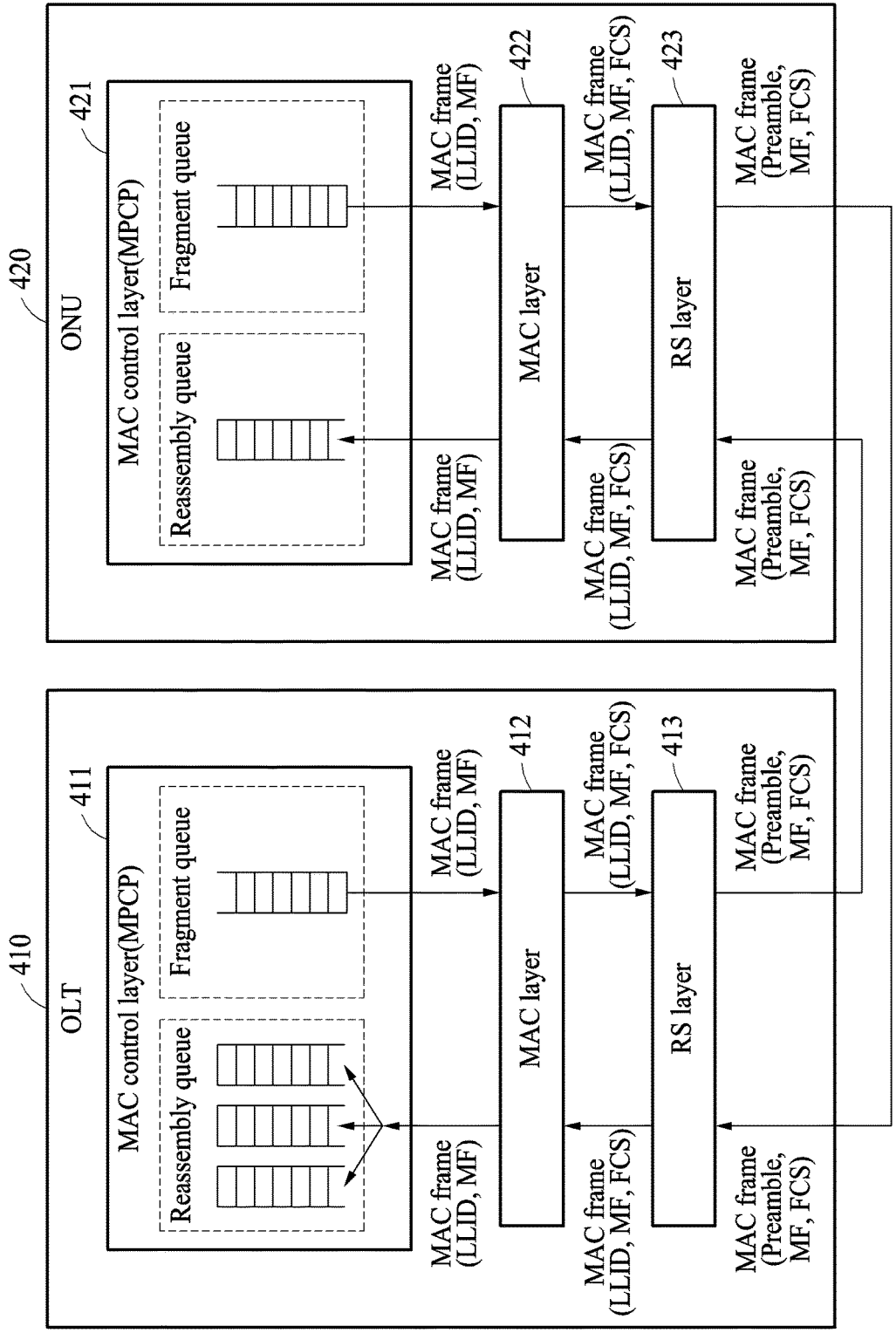
FIG. 4 is a diagram illustrating a structure of each of an optical line terminal (OLT) and an optical network unit (ONU) according to an embodiment.

FIG. 4 is a diagram illustrating a structure of each of an OLT 410 and an ONU 420 according to an embodiment. Referring to FIG. 4, a MAC control layer 411 of the OLT 410 and a MAC control layer 421 of the ONU 420 may each include a fragment queue and a reassembly queue to transmit or receive fragments. Each of the OLT 410 and the ONU 420 may store received fragments in the reassembly queue. For example, each of the OLT 410 and the ONU 420 may store fragments generated from a MAC frame in the fragment queue in an order from a fragment corresponding to a start portion of the MAC frame to a fragment corresponding to an end portion of the MAC frame, and may transmit the fragments in the order.

Hereinafter, operations of the OLT 410 and the ONU 420 to transmit and receive fragments in a downstream direction are described. When the ONU 420 performs a fragmentation function and when the OLT 410 transmits a MAC frame with a length greater than an MTU to the ONU 420, the OLT 410 may fragment the MAC frame based on the MTU. The OLT 410 may generate a plurality of fragments by dividing a payload of the MAC frame. A length of a payload included in each of the plurality of generated fragments may be less than or equal to the MTU. Based on which portion of the payload of the MAC frame corresponds to a payload of each of the plurality of generated fragments, the OLT 410 may store the plurality of generated fragments in the fragment queue of the MAC control layer 411. For example, a fragment corresponding to an end portion of the payload of the MAC frame may be last stored in the fragment queue. Also, a fragment corresponding to a start portion of the payload of the MAC frame may be stored earlier than the other fragments in the fragment queue.

The OLT 410 may transfer the fragments to a MAC layer 412 in an order that fragments are stored in the fragment queue. As described above, the fragments may be transferred to the MAC layer 412 in an order from the fragment corresponding to the start portion of the payload of the MAC frame to the fragment corresponding to the end portion of the payload of the MAC frame. Also, the OLT 410 may transfer information about fragmentation of the transferred fragments to the MAC layer 412 based on an MF value. For example, the OLT 410 may set the MF value to "1" to indicate that the MAC frame transferred to the MAC layer 412 is a fragment. When the fragment corresponding to the end portion of the payload of the MAC frame is transferred to the MAC layer 412, the OLT 410 may set the MF value to "0."

The OLT 410 and the ONU 420 may add or delete an FCS value of the MAC frame based on the MAC layer 412 and a MAC layer 422. The OLT 410 may connect an FCS to a fragment transferred from the MAC control layer 411 based on the MAC layer 412. The OLT 410 may transfer the MAC frame connected to the FCS to a reconciliation sublayer (RS) layer 413.

The OLT 410 and the ONU 420 may encode information about fragmentation of the MAC frame in an LLID field or an SLD field of a header (or preamble) of the MAC frame based on the RS layer 413 and an RS layer 423. The OLT 410 may encode an LLID field or an SLD field of a fragment transferred from the MAC layer 412 in the RS layer 413. The OLT 410 and the ONU 420 may determine whether the MAC frame is a fragment by interpreting the LLID field or the SLD field of the header of the MAC frame based on the RS layers 413 and 423.

In an example, when a fragment is transferred from the MAC layer 412 to the RS layer 413, the OLT 410 may set a $15^{th}$ bit of an LLID field of the fragment to "1." In this example, the OLT 410 may set the $15^{th}$ bit of the LLID field of the fragment to "1" until the fragment corresponding to the end portion of the payload of the MAC frame is transferred to the RS layer 413. When the fragment corresponding to the end portion of the payload of the MAC frame is transferred to the RS layer 413, the OLT 410 may set the $15^{th}$ bit of the LLID field of the fragment to "0." When a MAC frame that is not fragmented is transferred from the MAC layer 412 to the RS layer 413, the OLT 410 may set a $15^{th}$ bit of an LLID field of the MAC frame to "0."

In another example, when a fragment is transferred from the MAC layer 412 to the RS layer 413, the OLT 410 may record a portion of the MAC frame corresponding to the fragment in an SLD field of the fragment. Which one of a start portion, a middle portion and an end portion of the MAC frame corresponds to the fragment may be recorded in the SLD field of the fragment. When the MAC frame is transferred from the MAC layer 412 to the RS layer 413, the OLT 410 may record an 8-bit value of "D5" in the SLD field of the fragment.

The OLT 410 may transfer, to the ONU 420, a fragment in which an LLID field or an SLD field is encoded in the RS layer 413. An LLID field of a header of a fragment may include information (for example, a $15^{th}$ bit) associated with the fragment and an LLID of the ONU 420. When the fragment is transferred to the ONU 420, the OLT 410 may set a $15^{th}$ bit of an LLID field to "1" and may encode an LLID value of the ONU 420 in lower 14 bits based on the RS layer 413. When a MAC frame that is not fragmented is transferred to the ONU 420, the OLT 410 may set a $15^{th}$ bit of an LLID field to "0" and may encode the LLID value of the ONU 420 in lower 14 bits based on the RS layer 413.

To broadcast the MAC frame, the OLT 410 may encode a value other than the LLID value of the ONU 420 in the LLID field. When the OLT 410 transmits a MAC frame to all ONUs connected to the OLT 410, the OLT 410 may set an SCB value (MSB) of an LLID field to "1" based on the RS layer 413. When the OLT 410 transmits a MAC frame to 1G-EPON ONUs, the OLT 410 may set a value of an LLID field to "0x7FFF" based on the RS layer 413. When the OLT 410 transmits a MAC frame to 10G-EPON ONUS, the OLT 410 may set a value of an LLID field to "0x7FFE" based on the RS layer 413. When OLT 410 transmits a MAC frame to NG-EPON ONUs, the OLT 410 may set a value of an LLID field to "0x7FFD" based on the RS layer 413.

As described above, information about a fragment may be included in an LLID field or an SLD field of the fragment, and accordingly a fragmentation function of a MAC frame may be supported in a level 2. In addition, a length of a header of the fragment may remain unchanged in the information about the fragment, and thus it is possible to prevent an existing OLT and an existing ONU from malfunctioning even though the fragment is received.

When the MAC frame is received from the OLT 410, the ONU 420 may interpret the LLID field or the SLD field of the received MAC frame based on the RS layer 423. By interpreting the LLID field or the SLD field of the received MAC frame, the ONU 420 may determine whether the received MAC frame is a fragment.

In an example, when the ONU 420 does not support the fragmentation function, and when lower 15 bits of the LLID field of the received MAC frame are identical to the LLID value of the ONU 420, the received MAC frame may be transferred to the MAC layer 422. In another example, when the ONU 420 supports the fragmentation function, and when lower 14 bits of the LLID field of the received MAC frame are identical to the LLID value of the ONU 420, the received MAC frame may be transferred to the MAC layer 422. In this example, the ONU 420 may transfer an MF value recorded in a 15<sup>th</sup> bit of the LLID field of the received MAC frame to the MAC layer 422.

The ONU 420 may filter the received MAC frame based on the RS layer 423. The ONU 420 may interpret the LLID field of the header of the MAC frame and may determine whether the MAC frame is to be transmitted to the ONU 420. In an example, when an MSB (SCB value) of the LLID field of the received MAC frame is "1," the ONU 420 may transfer the received MAC frame to the MAC layer 422. In another example, when a value of the LLID field of the received MAC frame is identical to a broadcast LLID value corresponding to the ONU 420, the ONU 420 may transfer the received MAC frame to the MAC layer 422. In still another example, when a value of the LLID field of the received MAC frame is identical to an LLID value assigned to the ONU 420, the ONU 420 may transfer the received MAC frame to the MAC layer 422. In examples other than the above examples, the ONU 420 may filter the received MAC frame.

The ONU 420 may check for a payload of the received MAC frame based on an FCS of the received MAC frame in the MAC layer 422. When the checking of the payload of the received MAC frame is completed, the ONU 420 may transfer the received MAC frame to the MAC control layer 421. The ONU 420 may transfer an MF value together with the received MAC frame to the MAC control layer 421. When the ONU 420 receives a fragment, that is, when an MF value is "1," the ONU 420 may store the received fragment in a reassembly queue included in the MAC control layer 421. As described above, the fragment corresponding to the end portion of the MAC frame may have an MF value of "0." When a fragment with an MF value of "0" is transferred to the MAC control layer 421, the ONU 420 may restore the MAC frame based on the fragment stored in the reassembly queue and the received fragment. The ONU 420 may transfer the restored MAC frame to an upper layer. Thus, a MAC frame with a length greater than the MTU may be transmitted and received in the MAC control layers 411 and 421 of the OLT 410 and the ONU 420.

The ONU 420 may interpret an LLID value of the received MAC frame based on the RS layer 423. The ONU 420 may identify whether the received MAC frame is a broadcast MAC frame or a unicast MAC frame based on the LLID value of the received MAC frame. When the received MAC frame is determined as a broadcast MAC frame, the ONU 420 may receive the MAC frame without a change.

When the MAC frame is determined as a unicast MAC frame, the ONU 420 may perform LLID filtering. When the fragmentation function is deactivated by the ONU 420, the ONU 420 may perform LLID filtering based on lower 15 bits. When the fragmentation function is activated by the ONU 420, the ONU 420 may perform LLID filtering based on lower 14 bits.

The ONU 420 may determine whether the received MAC frame is a fragment based on a bit 15 including an MF value of the LLID field of the received MAC frame after the LLID filtering. When the bit 15 is "1," the ONU 420 may determine the received MAC frame as a fragment. The ONU 420 may transfer fragments and an MF value of "1" to the MAC control layer 421. When the bit 15 is "0," the ONU 420 may determine that the fragment corresponding to the end portion of the MAC frame is received and may transfer fragments and an MF value of "0" to the MAC control layer 421.

Similarly to the above-described operation of transmitting and receiving fragments in the downstream direction, fragments may be transmitted and received in the upstream direction. To transmit a MAC frame with a length greater than or equal to a grant size or a MAC frame with a length greater than or equal to an MTU, the ONU 420 may fragment the MAC frame. The ONU 420 may store a plurality of fragments generated by fragmenting the MAC frame in the fragment queue of the MAC control layer 421. The ONU 420 may transfer the plurality of fragments stored in the fragment queue to the MAC layer 422. The ONU 420 may set an FCS of each of the plurality of fragments based on the MAC layer 422. The ONU 420 may encode an MF value in an MSB of an LLID field of a header of each of the plurality of fragments based on the RS layer 423. The ONU 420 may record "1" as an MF value in an MSB of an LLID field of a fragment, and may record "0" in an MSB of an LLID field of a MAC frame that is not fragmented.

The OLT 410 may determine, based on the RS layer 413, whether the MAC frame received from the ONU 420 is a fragment. As described above, the OLT 410 may determine, based on the MSB of the LLID field of the header of the received MAC frame, whether the received MAC frame is a fragment. When the received MAC frame is determined as a fragment, the OLT 410 may store received fragments in the reassembly queue of the MAC control layer 411 for each LLID. The OLT 410 may include the reassembly queue identified by the LLID of the ONU 420.

The OLT 410 may store received fragments in the reassembly queue until the fragment (for example, a fragment with an MF value of "0") corresponding to the end portion of the MAC frame is received. When a fragment with an MF value of "0" is received, the OLT 410 may restore the MAC frame based on the received fragments and fragments stored in a fragment queue corresponding to an LLID of the fragment with the MF value of "0." The OLT 410 may transfer the restored MAC frame to an upper layer of the MAC control layer 411.

To transmit or receive fragments, the OLT 410 and the ONU 420 may need to inform each other that the OLT 410 and the ONU 420 are capable of transmitting or receiving fragments. The OLT 410 may inform the ONU 420 that the OLT 410 is capable of transmitting or receiving fragments in a process of registering the ONU 420. The ONU 420 may inform the OLT 410 that the ONU 420 is capable of transmitting or receiving fragments in a process of joining the OLT 410. Hereinafter, operations of the OLT 410 and the ONU 420 performed prior to transmitting or receiving of fragments so as to transmit or receive fragments will be further described.

Figure 5:
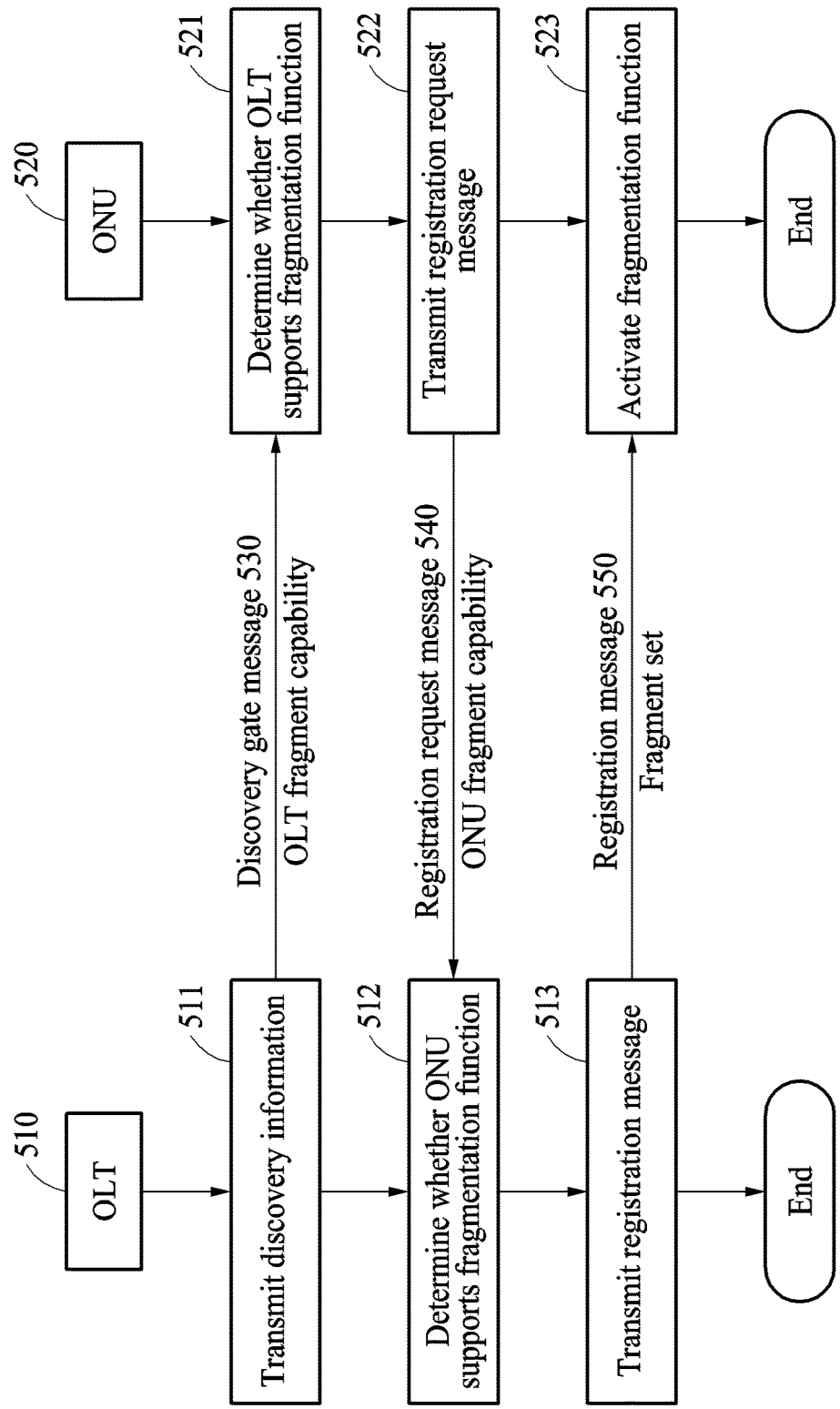
FIG. 5 is a flowchart illustrating operations of an OLT and an ONU to inform each other that the OLT and the ONU are capable of transmitting or receiving fragments according to an embodiment.

FIG. 5 is a flowchart illustrating operations of an OLT 510 and an ONU 520 to inform each other that the OLT 510 and the ONU 520 are capable of transmitting or receiving fragments according to an embodiment. In a process of registering the ONU 520 (that is, a process by which the ONU 520 joins the OLT 510), the OLT 510 may set a fragmentation function for the ONU 520. In a process of joining the OLT 510, the ONU 520 may set a fragmentation function for the OLT 510.

Referring to FIG. 5, in operation 511, the OLT 510 may transmit discovery information indicating whether a fragmentation function of a MAC frame is supported to the ONU 520. For example, the OLT 510 may transmit a discovery gate message 530 including the discovery information to the ONU 520. The discovery gate message 530 may be a DISCOVERY_GATE multi-point control protocol data unit (MPCPDU) control message based on an MPCPDU. The discovery information may include information about whether the OLT 510 is capable of fragmenting a MAC frame and information about whether the OLT 510 is capable of restoring a MAC frame from fragments.

Figure 6:
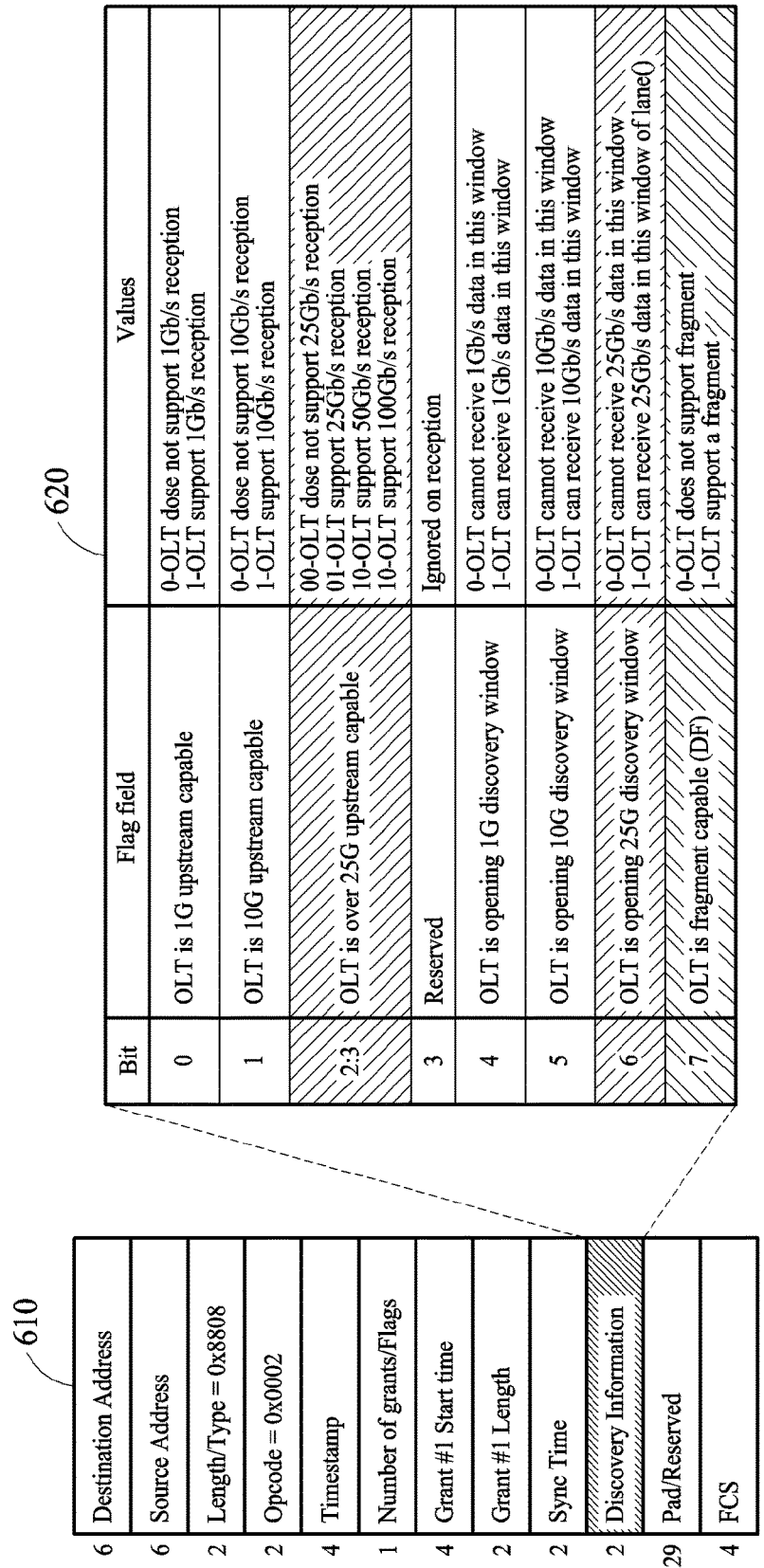
FIG. 6 is a diagram illustrating a structure of a discovery gate message according to an embodiment.

FIG. 6 is a diagram illustrating a structure of a discovery gate message 610 according to an embodiment. FIG. 6 illustrates names and sizes (in bytes) of fields included in the discovery gate message 610 based on an MPCPDU. A source address of the discovery gate message 610 may include a MAC address of an OLT that generates the discovery gate message 610. The discovery gate message 610 may include information associated with synchronization and information about a discovery window that is a time that allows an ONU to transmit a registration request message.

Referring to FIG. 6, the discovery gate message 610 may include discovery information 620. The discovery information 620 may include a don't fragment (DF) field that indicates whether an OLT supports a fragmentation function. For example, when the OLT does not support the fragmentation function, the DF field may be set to a value of "0." In this example, when the discovery gate message 610 including the DF field with the value of "0" is received, an ONU may deactivate the fragmentation function. When the OLT supports the fragmentation function, the DF field may be set to a value of "1." Based on whether the ONU supports the fragmentation function, the OLT that supports the fragmentation function may activate the fragmentation function for the ONU.

Referring back to FIG. 5, when the discovery gate message 530 is received, the ONU 520 may determine whether the OLT 510 supports the fragmentation function in operation 521. The ONU 520 may determine, based on the discovery information of the discovery gate message 530, whether the OLT 510 supports the fragmentation function. The ONU 520 may determine, based on a DF field of the discovery gate message 530, whether the OLT 510 supports the fragmentation function.

When the OLT 510 is determined to support the fragmentation function, the ONU 520 may inform the OLT 510 that the ONU 520 supports the fragmentation function. For example, the ONU 510 may transmit a registration request message 540 to the OLT 510 in operation 522, to inform the OLT 510 that the ONU 520 supports the fragmentation function. After an arbitrary delay time, the ONU 520 may transmit the registration request message 540 to the OLT 510. The registration request message 540 may include, for example, information about whether the ONU 520 is capable of fragmenting a MAC frame and information about whether the ONU 520 is capable of restoring a MAC frame from fragments.

Figure 7:
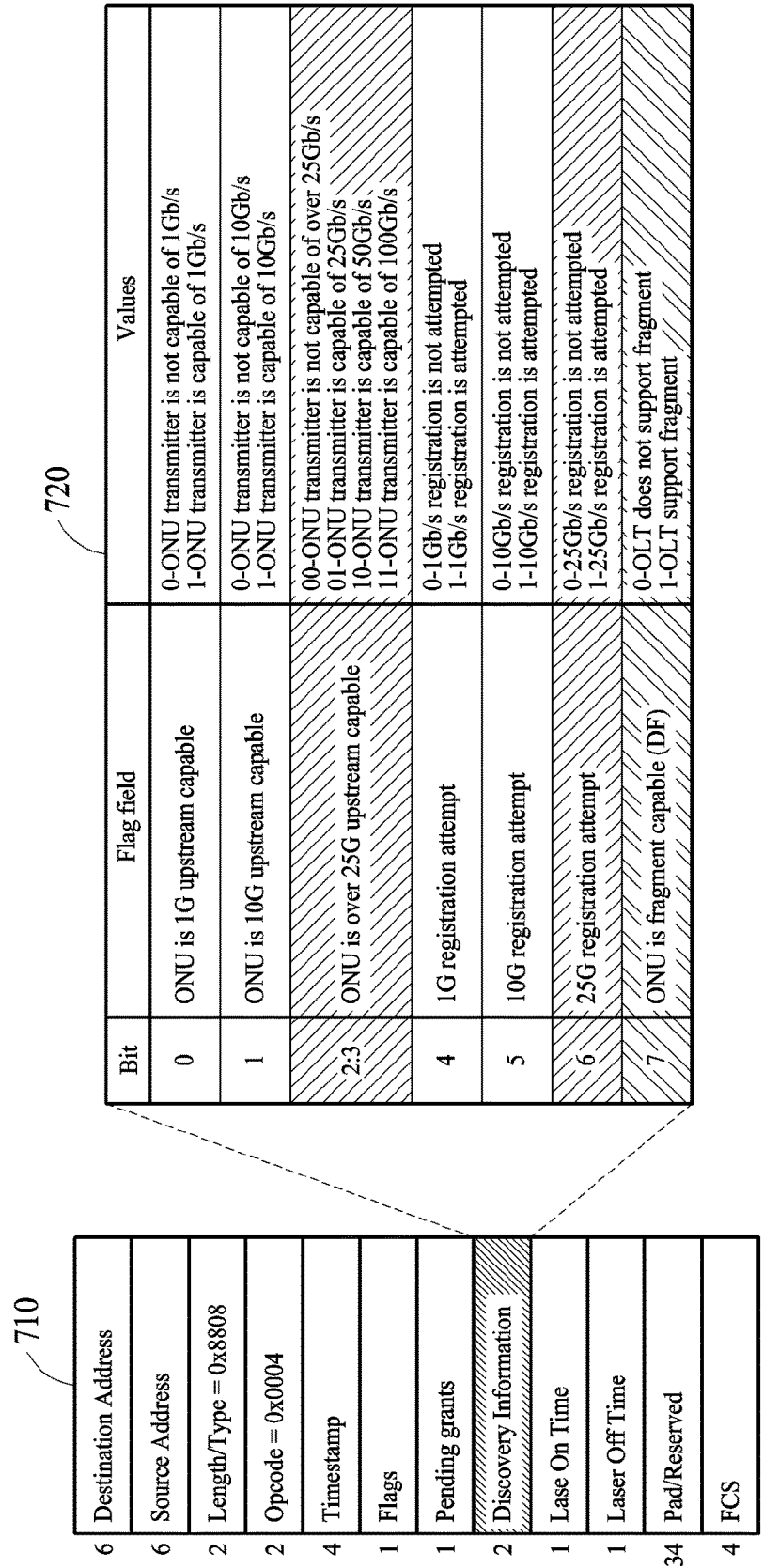
FIG. 7 is a diagram illustrating a structure of a registration request message according to an embodiment.

The registration request message 540 may be a REGISTER_REQ MPCPDU control message based on the MPCPDU. FIG. 7 is a diagram illustrating a structure of a registration request message 710 according to an embodiment. A source address of the registration request message 710 may include a MAC address of an ONU that generates the registration request message 710. The registration request message 710 may include discovery information 720 indicating whether an ONU supports a fragmentation function and information about an operating time of a laser.

Referring to FIG. 7, an ONU may transfer information about whether the ONU supports a fragmentation function to an OLT based on a bit 7 (a DF field) of the discovery information 720 of 2 bytes. An ONU that supports the fragmentation function may set the DF field to "1." An ONU that does not support the fragmentation function may set the DF field to "0."

Referring back to FIG. 5, in operation 512, the OLT 510 may determine whether the ONU 520 supports the fragmentation function based on the registration request message 540 transmitted by the ONU 520 in response to the discovery information. For example, the OLT 510 may determine, based on a DF field of discovery information included in the registration request message 540, whether the ONU 520 supports the fragmentation function. Also, the OLT 510 may determine, based on the registration request message 540, whether the ONU 520 is to activate the fragmentation function.

In operation 513, the OLT 510 may transmit a registration message 550 to the ONU 520. The OLT 510 may transmit, to the ONU 520, the registration message 550 to request the ONU 520 to activate the fragmentation function. The OLT 510 may assign an LLID to the ONU 520 based on the registration message 550. Also, the OLT 510 may determine whether the fragmentation function is to be activated for each LLID based on the registration message 550. The registration message 550 may be used as an acknowledgement (ACK) for the registration request message 540.

Figure 8:
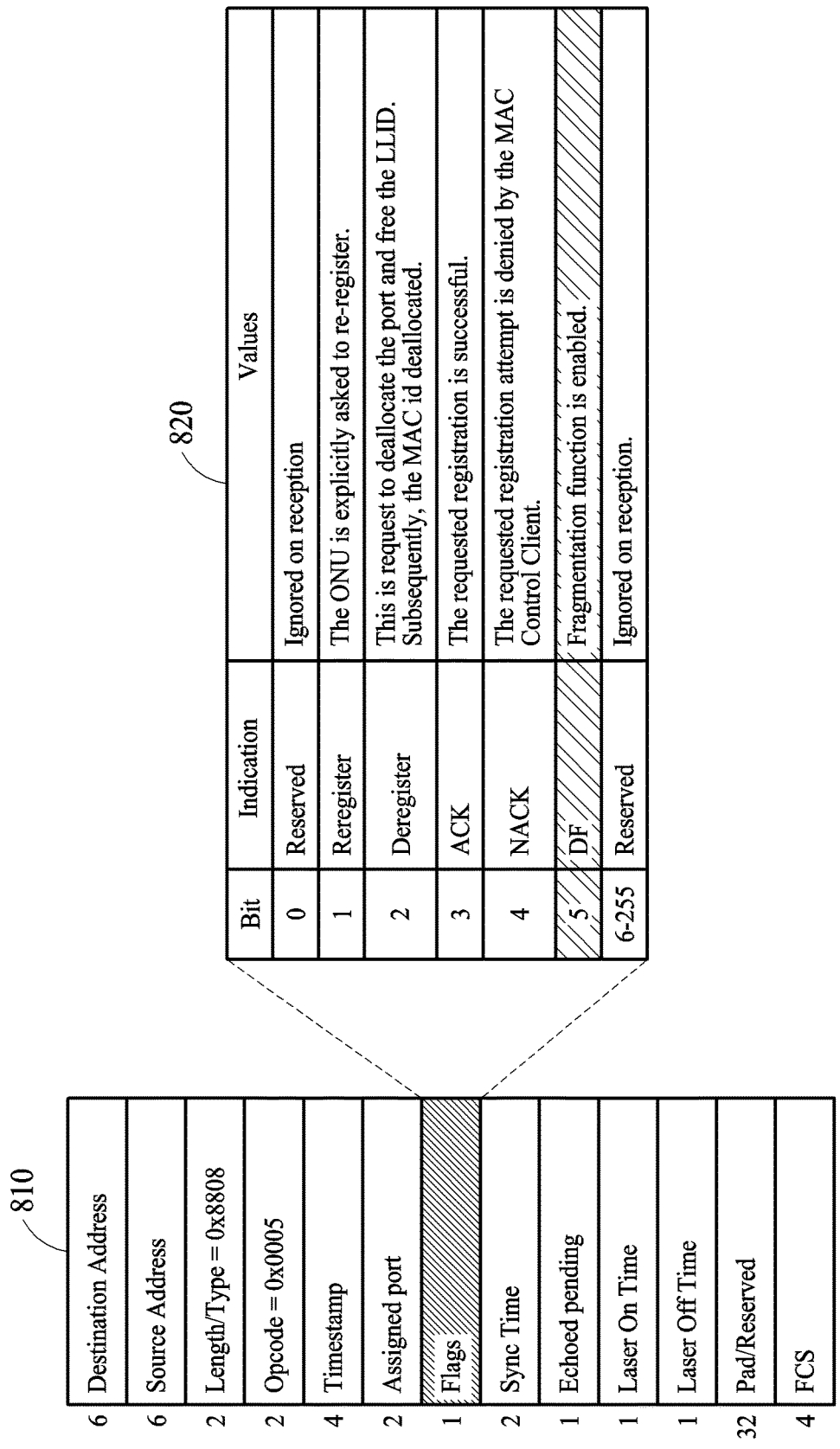
FIG. 8 is a diagram illustrating a structure of a registration message according to an embodiment.

The registration message 550 may be a REGISTER MPCPDU control message based on the MPCPDU. FIG. 8 is a diagram illustrating a structure of a registration message 810 according to an embodiment. A destination address of the registration message 810 may include a MAC address of an ONU. A source address of the registration message 810 may include a MAC address of an ONU that generates the registration message 810. The registration message 810 may include an LLID of an ONU and information about an operating time of a laser.

Referring to FIG. 8, the registration message 810 may indicate whether an ONU is to activate a fragmentation function of a MAC frame, based on a flag field 820. In an example, when the flag field 820 has a value of "5," an OLT and an ONU may activate a fragmentation function of a MAC frame in a downstream direction. In this example, the OLT may enable an ONU that receives the registration message 810 to fragment and transmit a MAC frame and may not enable the ONU to restore the MAC frame from fragments. In another example, when the flag field 820 has a value of "6," an OLT and an ONU may activate a fragmentation function of a MAC frame in an upstream direction. In still another example, when the flag field 820 has a value of "7," an OLT and an ONU may activate a fragmentation function of a MAC frame in both the downstream direction and the upstream direction. The OLT may independently determine, based on the flag field 820, whether to perform the fragmentation function in the downstream direction or the upstream direction. Thus, the OLT may more efficiently manage a network.

Referring back to FIG. 5, in operation 523, the ONU 520 may activate the fragmentation function based on the registration message 550 transmitted by the OLT 510 in response to the registration request message 540. Thus, when the OLT 510 does not activate the fragmentation function based on the registration message 550 even when the ONU 520 supports the fragmentation function, the fragmentation function for the ONU 520 may be deactivated. The ONU 520 may determine, based on a flag field included in the registration message 550, whether to restore a MAC frame from fragments in the downstream direction and whether to generate fragments by fragmenting a MAC frame in the upstream direction.

The OLT 510 and the ONU 520 may be completely ready for fragmentation of a MAC frame by performing the above-described operations.

Figure 9:
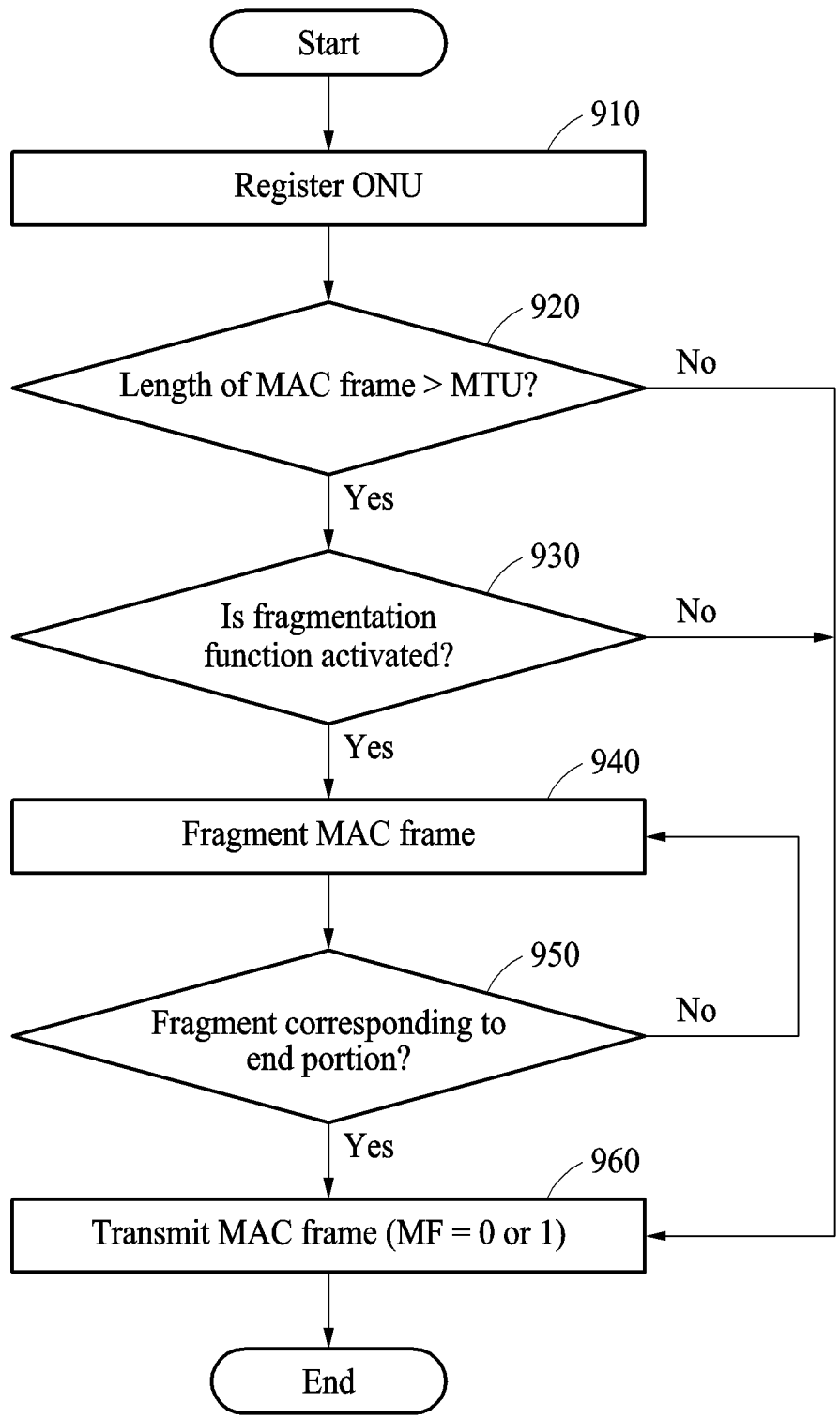
FIG. 9 is a flowchart illustrating an operation of an OLT to fragment and transmit a MAC frame in a downstream direction according to an embodiment.

FIG. 9 is a flowchart illustrating an operation of an OLT to fragment and transmit a MAC frame in a downstream direction according to an embodiment.

Referring to FIG. 9, in operation 910, the OLT may register an ONU configured to fragment a MAC frame. The OLT may register the ONU by performing the operations described above with reference to FIGS. 5, 6, 7 and 8. The OLT may determine whether the ONU is to activate a fragmentation function of a MAC frame based on an LLID of the ONU.

In operation 920, the OLT may compare a length of a MAC frame that needs to be transmitted to the ONU to an MTU that is a maximum length of a MAC frame that is to be transmitted at a time. When the length of the MAC frame is less than the MTU, the OLT may transmit the MAC frame to the ONU instead of fragmenting the MAC frame. When the length of the MAC frame is greater than or equal to the MTU, the OLT may generate a plurality of fragments by dividing the MAC frame based on the MTU.

The OLT may generate the plurality of fragments, based on whether the ONU is to activate the fragmentation function. In operation 930, the OLT may determine whether the fragmentation function is activated by the ONU to which the MAC frame needs to be transmitted. The OLT may determine, based on the LLID of the ONU, whether the fragmentation function is activated in the downstream direction.

When the fragmentation function is activated in the downstream direction, the OLT may fragment the MAC frame in operation 940. When the MAC frame is set to be divided and transmitted to the ONU, the OLT may generate the plurality of fragments by dividing the MAC frame based on the MTU. The OLT may store the plurality of generated fragments in a fragment queue.

In operation 950, the OLT may determine whether a fragment corresponding to an end portion of a payload of the MAC frame is generated. When the fragment corresponding to the end portion of the payload of the MAC frame is not generated, the OLT may continue to fragment the MAC frame. When the fragment corresponding to the end portion of the payload of the MAC frame is generated, the OLT may determine completion of fragmentation of the MAC frame.

In operation 960, the OLT may transmit the plurality of generated fragments or the MAC frame to the ONU. As described above, when the length of the MAC frame is less than the MTU or when the ONU does not support fragmentation of the MAC frame, the OLT may transmit the MAC frame to the ONU instead of fragmenting the MAC frame. When the plurality of fragments including the fragment corresponding to the end portion of the payload of the MAC frame are generated, the OLT may transmit the plurality of fragments to the ONU in an order that the plurality of fragments are stored in the fragment queue. A header of each of the plurality of fragments may include information associated with the fragmentation. For example, an SLD field of the header may include information about which one of a start portion, a middle portion and an end portion of the MAC frame corresponds to each of the plurality of fragments. An LLID field of the header may include information about whether each of the plurality of fragments corresponds to the end portion of the MAC frame.

Figure 10:
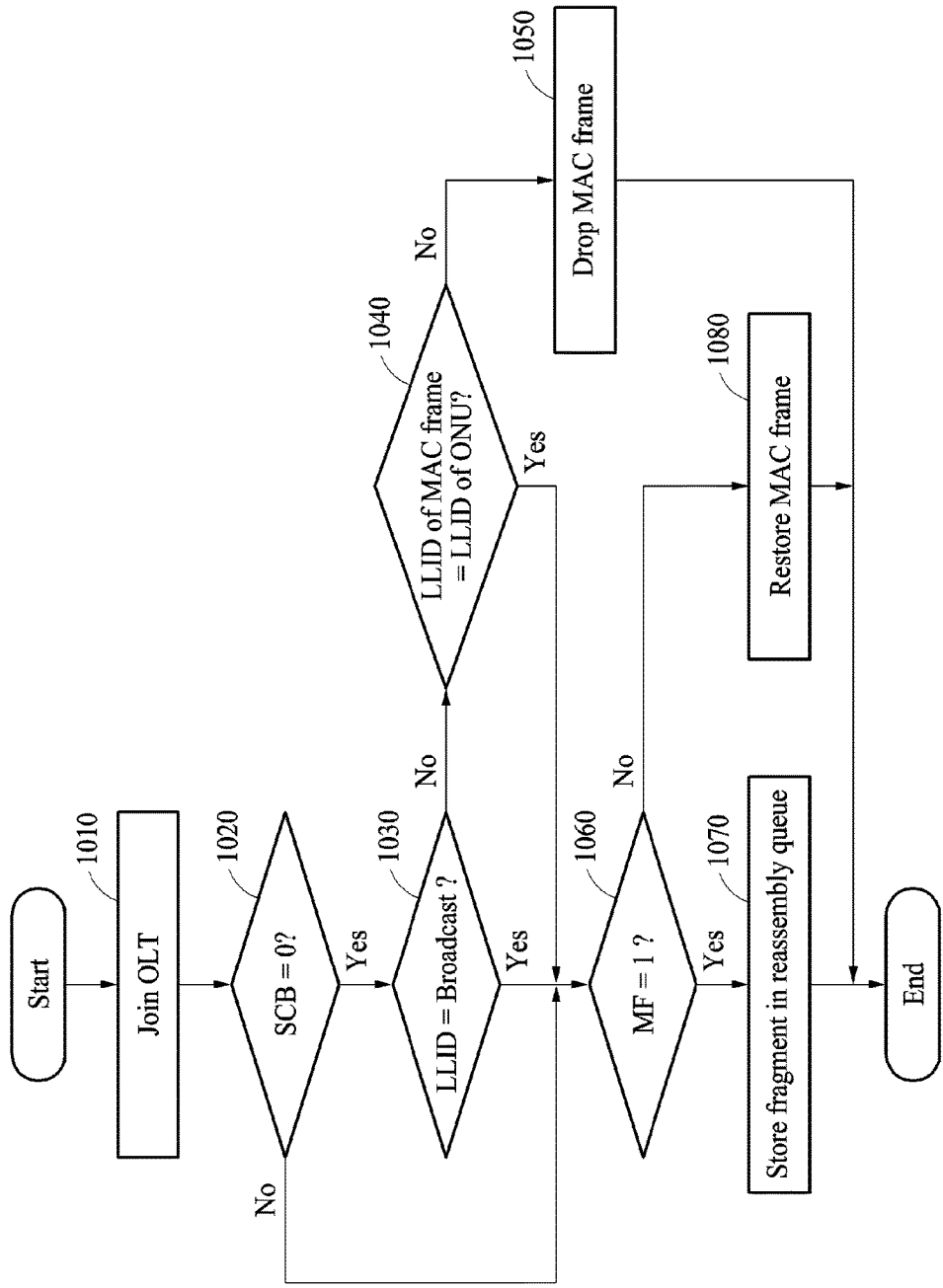
FIG. 10 is a flowchart illustrating an operation of an ONU to restore a MAC frame by receiving fragments in a downstream direction according to an embodiment.

FIG. 10 is a flowchart illustrating an operation of an ONU to restore a MAC frame by receiving fragments in a downstream direction according to an embodiment.

Referring to FIG. 10, in operation 1010, the ONU may join an OLT. The ONU may join the OLT by performing the operations described above with reference to FIGS. 5 through 8. The ONU may inform the OLT that the ONU supports a fragmentation function while joining the OLT. Based on a registration message transmitted by the OLT, the ONU may activate the fragmentation function in the downstream direction.

When a MAC frame is received, the ONU may determine whether an SCB value of a header of the MAC frame is "0" in operation 1020. For example, when all ONUs connected to the OLT need to receive a MAC frame, the OLT may set an SCB value of a header of the MAC frame to "1."

When the SCB value is determined as "0," the ONU may determine whether an LLID value of the header of the MAC frame is identical to a broadcast value in operation 1030. For example, when at least one ONU satisfying a predetermined condition among ONUs connected to the OLT needs to receive a MAC frame, the OLT may set an LLID value of a header of the MAC frame to a broadcast value corresponding to the predetermined condition.

When the LLID value of the header of the MAC frame is different from a broadcast value corresponding to the ONU, the ONU may determine whether the LLID value is identical to an LLID value assigned to the ONU in operation 1040. When the LLID value is determined to be different from the LLID value assigned to the ONU, the ONU may drop the MAC frame in operation 1050.

For example, when it is determined that the SCB value is "1," that the LLID value of the header of the MAC frame is identical to the broadcast value, or that the LLID value of the header of the MAC frame is identical to the LLID value assigned to the ONU, the ONU may determine whether the received MAC frame is a fragment. For example, the ONU may determine whether a fragment generated by dividing the MAC frame is received from the OLT.

The ONU may determine whether an MF value included in the header of the MAC frame is "1" in operation 1060. A fragment corresponding to a start portion or a middle portion of the MAC frame may have an MF value of "1." When the MF value is "1," the ONU may determine that the received MAC frame is a fragment, and may store the fragment in a reassembly queue in operation 1070. Thus, the fragment corresponding to the start portion or the middle portion of the MAC frame may be stored in the reassembly queue.

A fragment corresponding to an end portion of the MAC frame may have an MF value of "0." When the MF value is "0," the ONU may restore the MAC frame from a plurality of fragments stored in the reassembly queue in operation 1080. All the fragments generated from the MAC frame may be received by receiving the fragment corresponding to the end portion of the MAC frame, and thus the ONU may restore the MAC frame from the fragments stored in the reassembly queue.

The OLT and the ONU may need to transmit an Ethernet MAC frame that is left after fragmentation at all times, to prevent a change in an order of a MAC frame.

Figure 11:
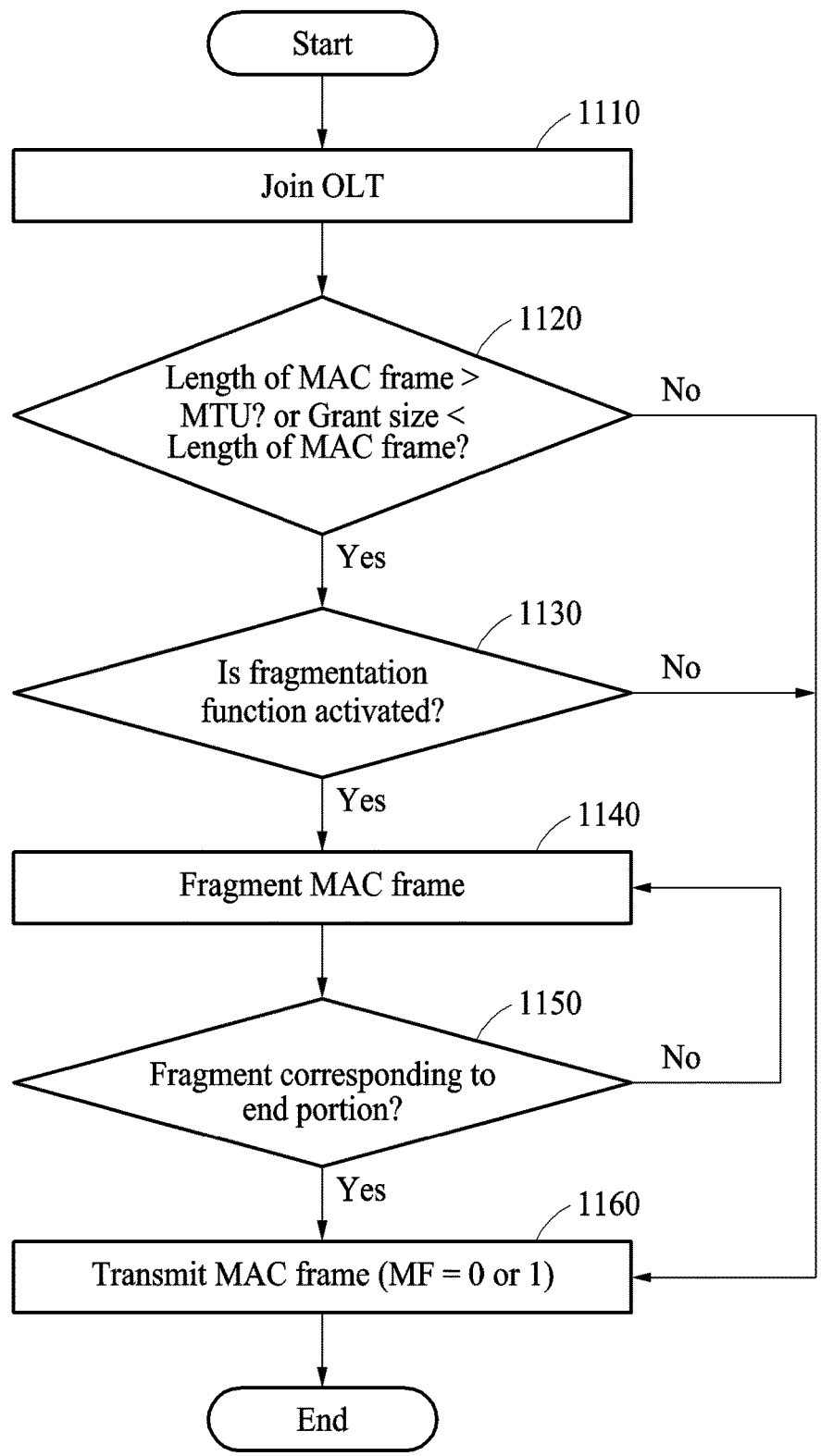
FIG. 11 is a flowchart illustrating an operation of an ONU to fragment and transmit a MAC frame in an upstream direction according to an embodiment.

FIG. 11 is a flowchart illustrating an operation of an ONU to fragment and transmit a MAC frame in an upstream direction according to an embodiment.

Referring to FIG. 11, in operation 1110, the ONU may join an OLT configured to fragment a MAC frame. The ONU may join the OLT by performing the operations described above with reference to FIGS. 5 through 8.

In operation 1120, the ONU may determine whether a length of a MAC frame that is to be transmitted to the OLT is greater than or equal to an MTU, or whether a length of a MAC frame that is to be transmitted is greater than a grant size. The grant size may refer to a length of a MAC frame that is to be transmitted to the OLT during a predetermined period of time. When the length of the MAC frame is determined to be greater than or equal to the MTU, or when the length of the MAC frame is determined to be greater than the grant size, the ONU may determine whether the OLT supports a fragmentation function in the upstream direction in operation 1130.

When the OLT is determined to support the fragmentation function in the upstream direction, the ONU may generate a plurality of fragments by dividing the MAC frame based on the MTU or the grant size. In operation 1140, the ONU may fragment the MAC frame.

The ONU may store the plurality of generated fragments in a fragment queue. When a fragment corresponding to an end portion of a payload of the MAC frame is generated in operation 1150, the ONU may transmit the plurality of generated fragments to the OLT in operation 1160. The ONU may record an MF value in an LLID field of a header of a fragment. The ONU may set an MF value of a header of each of fragments other than the fragment corresponding to the end portion of the payload of the MAC frame to "1." Also, the ONU may set an MF value of a header of the fragment corresponding to the end portion of the payload of the MAC frame to "0." The ONU may record an MF value in an MSB of an LLID field of a header of a fragment, to indicate a portion of the MAC frame corresponding to the fragment.

Figure 12:
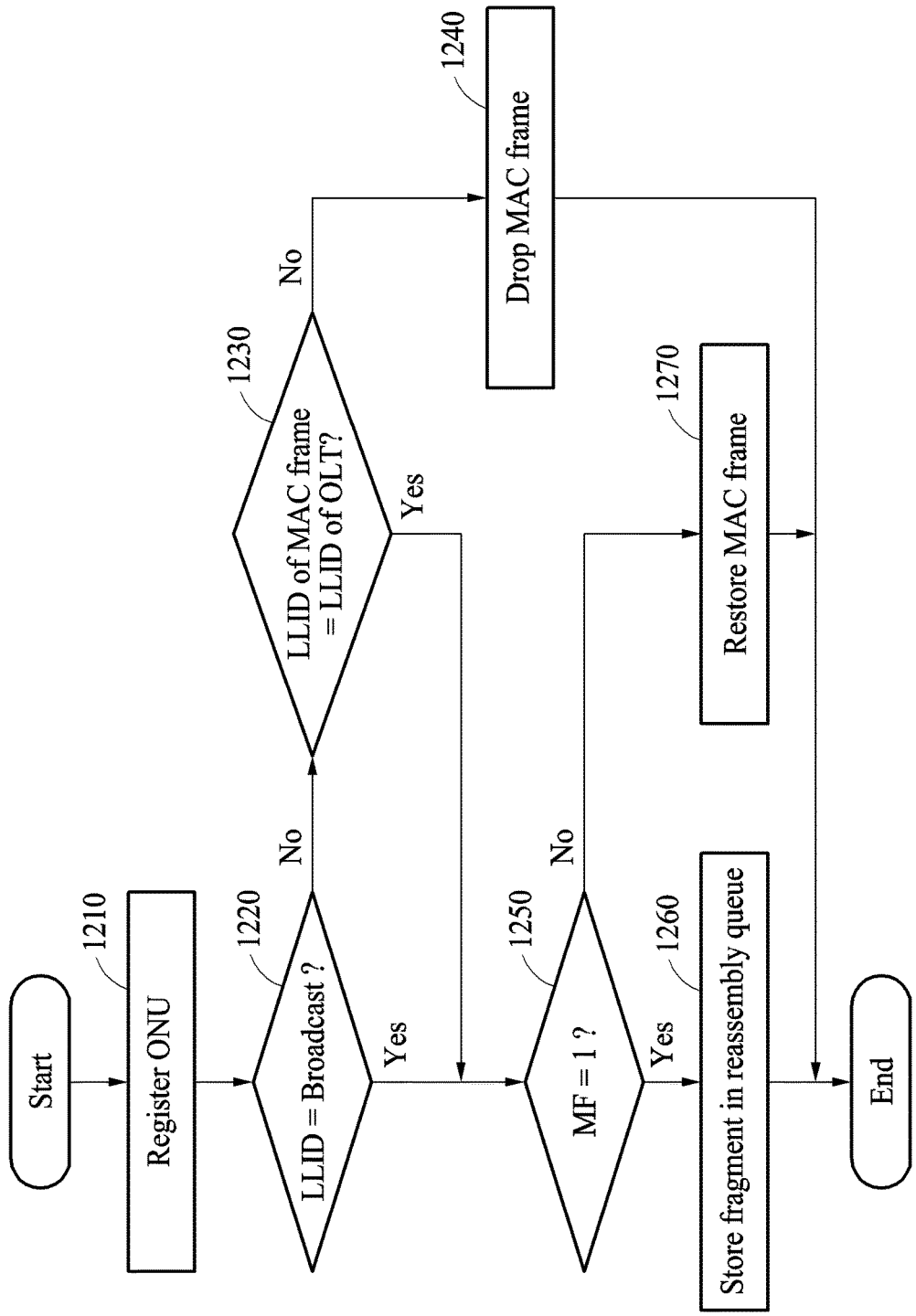
FIG. 12 is a flowchart illustrating an operation of an OLT to restore a MAC frame by receiving fragments in an upstream direction according to an embodiment.

FIG. 12 is a flowchart illustrating an operation of an OLT to restore a MAC frame by receiving fragments in an upstream direction according to an embodiment.

Referring to FIG. 12, in operation 1210, the OLT may register an ONU. The OLT may register the ONU by performing the operations described above with reference to FIGS. 5 through 8. When a MAC frame is received from the ONU, the OLT may determine whether the received MAC frame is a fragment.

In operation 1220, the OLT may determine whether an LLID of the received MAC frame has a broadcast value. When the LLID of the received MAC frame does not have the broadcast value, the OLT may determine whether the LLID of the received MAC frame is identical to an LLID of the OLT in operation 1230. When the LLID of the received MAC frame is determined to be different from the LLID of the OLT, the OLT may drop the received MAC frame in operation 1240.

For example, when it is determined that the LLID of the received MAC frame has the broadcast value, or that the LLID of the received MAC frame is identical to the LLID of the OLT, the OLT may determine whether the received MAC frame is a fragment. In operation 1250, the OLT may determine whether an MF value included in a header of the received MAC frame is "1." As described above, an MF value of a header of each of fragments other than a fragment corresponding to an end portion of a payload of the MAC frame may be set to "1." When the MF value in the header of the received MAC frame is determined as "1," the received MAC frame may be determined as a fragment. In operation 1260, the OLT may store the fragment in a reassembly queue.

An MF value of a header of the fragment corresponding to the end portion of the payload of the MAC frame may be set to "0." When the MF value in the header of the received MAC frame is determined as "0," all fragments generated from the MAC frame may be determined to be received. In operation 1270, the OLT may restore the MAC frame from the fragment stored in the reassembly queue and the received fragments.

The units described herein may be implemented using hardware components, software components, or a combination thereof. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A media access control (MAC) frame transmission method for downstream transmission, the MAC frame transmission method being performed by an optical line terminal (OLT), and comprising:
   registering an optical network unit (ONU) configured to fragment a MAC frame;
   determining whether the ONU supports a fragmentation function based on a registration request message being sent from the ONU in the registering;
   generating, in response to the ONU is determined to supports the fragmentation function, a plurality of fragments by dividing the MAC frame based on a maximum transmission unit (MTU) when a length of a MAC frame that is to be transmitted to the ONU is greater than or equal to the MTU, the MTU being a maximum length of a MAC frame to be transmitted at a time; and
   transmitting the plurality of fragments to the ONU,
   wherein an each of the plurality of fragments comprising a field indicating a position of the each of the plurality of fragments in the MAC frame.

2. The MAC frame transmission method of claim 1, wherein the registering comprises:
   transmitting, to the ONU, discovery information indicating whether the OLT supports a fragmentation function of the MAC frame;
   determining whether the ONU supports the fragmentation function based on the registration request message that is transmitted by the ONU in response to the discovery information;
   determining whether the ONU is to activate the fragmentation function based on the registration request message; and
   transmitting, to the ONU, a registration message to request the ONU to activate the fragmentation function.

3. The MAC frame transmission method of claim 1, wherein the generating comprises, when the MAC frame is set to be divided and transmitted to the ONU, generating the plurality of fragments by dividing the MAC frame based on the MTU.

4. The MAC frame transmission method of claim 1, wherein the transmitting comprises recording which one of a start portion, a middle portion and an end portion of the MAC frame corresponds to each of the plurality of fragments in a start of logical link identifier (LLID) delimiter (SLD) field of a header of each of the plurality of fragments, and transmitting the plurality of fragments.

5. The MAC frame transmission method of claim 1, wherein the transmitting comprises recording whether each of the plurality of fragments corresponds to an end portion of the MAC frame in an LLID field of a header of each of the plurality of fragments, and transmitting the plurality of fragments.

6. The MAC frame transmission method of claim 1, wherein the generating comprises storing the plurality of fragments in a fragment queue of the OLT.

7. A media access control (MAC) frame reception method for upstream transmission, the MAC frame reception method being performed by an optical line terminal (OLT), and comprising:
   determining whether a fragment generated by dividing a MAC frame is received from an optical network unit (ONU);
   storing the fragment in a reassembly queue when the fragment is determined to be received; and
   restoring the MAC frame from fragments stored in the reassembly queue when all fragments generated from the MAC frame are received,
   wherein the determining comprises determining, based on a logical link identifier (LLID) field or a start of LLID delimiter (SLD) field of a header of the received fragment, whether the fragment generated by dividing the MAC frame is received from the ONU,
   wherein the restoring comprises identifying a position of an each of the fragments in the MAC frame based on a predetermined field of the each of the fragments.

8. The MAC frame reception method of claim 7, wherein the storing comprises storing the fragment in a reassembly queue corresponding to an LLID of the ONU.

9. A media access control (MAC) frame transmission method for upstream transmission, the MAC frame transmission method being performed by an optical network unit (ONU), and comprising:
   joining an optical line terminal (OLT) configured to fragment a MAC frame;
   determining whether the OLT supports a fragmentation function based on a discovery information being sent from the OLT in the joining;
   generating, in response to the OLT is determined to supports the fragmentation function, a plurality of fragments by dividing the MAC frame based on a maximum transmission unit (MTU) when a length of a MAC frame that is to be transmitted to the OLT is greater than or equal to the MTU, the MTU being a maximum length of a MAC frame to be transmitted at a time; and
   transmitting the plurality of fragments to the OLT,
   wherein the each of the plurality of fragments comprising a field indicating a position of the each of the plurality of fragments in the MAC frame.

10. The MAC frame transmission method of claim 9, wherein the joining comprises:
    determining whether the OLT supports the fragmentation function of the MAC frame based on the discovery information received from the OLT;
    transmitting a registration request message to the OLT to inform the OLT that the ONU supports the fragmentation function, when the OLT is determined to support the fragmentation function; and
    activating the fragmentation function based on a registration message transmitted by the OLT in response to the registration request message.

11. The MAC frame transmission method of claim 9, wherein the generating comprises, when the MAC frame is set to be divided and transmitted to the OLT, generating the plurality of fragments by dividing the MAC frame based on the MTU.

12. The MAC frame transmission method of claim 9, wherein the transmitting comprises recording that the ONU generates the plurality of fragments from the MAC frame in a single copy broadcast (SCB) field of a header of each of the plurality of fragments, and transmitting the plurality of fragments.

13. The MAC frame transmission method of claim 9, wherein the generating comprises storing the plurality of fragments in a fragment queue of the ONU.

* * * * *